United States Patent
Liu et al.

(10) Patent No.: US 12,509,376 B2
(45) Date of Patent: Dec. 30, 2025

(54) MOVING BED BIOFILM REACTOR

(71) Applicant: Industrial Technology Research Institute, Hsinchu (TW)

(72) Inventors: Yi-Hong Liu, Hsinchu County (TW); Cheng-Chin Chang, Miaoli County (TW); Ting-Ting Chang, Taichung (TW); Kuan-Foo Chang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 383 days.

(21) Appl. No.: 18/136,565

(22) Filed: Apr. 19, 2023

(65) Prior Publication Data

US 2024/0190737 A1 Jun. 13, 2024

(30) Foreign Application Priority Data

Dec. 13, 2022 (TW) .................................. 111147736

(51) Int. Cl.
*C02F 3/08* (2023.01)
*C02F 9/00* (2023.01)

(52) U.S. Cl.
CPC ................ *C02F 3/085* (2013.01); *C02F 9/00* (2013.01); *C02F 2203/006* (2013.01); *C02F 2301/08* (2013.01)

(58) Field of Classification Search
CPC ............ C02F 2203/006; C02F 2301/08; C02F 3/085; C02F 9/00

(Continued)

(56) References Cited

U.S. PATENT DOCUMENTS 8,057,673 B2 11/2011 Chang
8,273,246 B2 9/2012 Chang
(Continued)

FOREIGN PATENT DOCUMENTS

CN 103228580 A 7/2013
CN 111747535 A * 10/2020 .............. C02F 3/302
(Continued)

OTHER PUBLICATIONS

Liu et al, CN 111747535, English machine translation, pp. 1-10 (Year: 2020).*

(Continued)

*Primary Examiner* — Claire A Norris
(74) *Attorney, Agent, or Firm* — WPAT, PC (57) ABSTRACT

A moving bed biofilm reactor includes a tank body, a first tube, a second tube, a first guiding structure, a second guiding structure and a return pipe. A reaction zone is formed in the tank body by the first tube and the second tube. A three-phase separation zone is formed in the tank body by the first guiding structure and the second guiding structure. By using multi-layer horizontal water curtain disturbances formed by the first tube and the second tube, fluid contaminant could be well mixed in the reaction zone. Thereupon, gas desorption from bio carriers can be increased, the possibility for micro organisms to attach the bio carriers can be raised, the guiding of gas emission can be improved, and thus performance of the fluid treatment in the anaerobic biological process can be substantially enhanced.

14 Claims, 9 Drawing Sheets

(58) Field of Classification Search
USPC .......................................................... 210/617
See application file for complete search history.

(56) References Cited

U.S. PATENT DOCUMENTS

| | | | |
|---|---|---|---|
| 9,096,448 | B2 | 8/2015 | Tokutomi |
| 9,742,155 | B2 | 8/2017 | Dubost |
| 9,896,363 | B2 | 2/2018 | Seidl |
| 9,902,635 | B2 | 2/2018 | Bott |
| 11,267,737 | B2 | 3/2022 | Basu |
| 2016/0289107 | A1* | 10/2016 | Seidl .................. C02F 3/30 |
| 2020/0095146 | A1 | 3/2020 | Lemaire |
| 2021/0047204 | A1 | 2/2021 | Magnusson |
| 2021/0163328 | A1 | 6/2021 | Larson |
| 2021/0276902 | A1 | 9/2021 | Neu |
| 2022/0017392 | A1 | 1/2022 | Fourcans |

FOREIGN PATENT DOCUMENTS

| | | |
|---|---|---|
| CN | 213012198 U | 4/2021 |
| CN | 112805249 A | 5/2021 |
| CN | 214780979 U | 11/2021 |
| CN | 216155569 U | 4/2022 |
| EP | 3630685 B1 | 4/2022 |
| TW | 409067 B | 10/2000 |
| TW | 201022160 A | 6/2010 |
| TW | 201024231 A | 7/2010 |
| TW | 201235311 A | 9/2012 |
| TW | 201345844 A | 11/2013 |
| TW | 201527022 A | 7/2015 |
| TW | I503290 B | 10/2015 |
| WO | WO2019213578 A1 | 11/2019 |
| WO | WO2021093214 A1 | 5/2021 |
| WO | WO2022043550 A1 | 3/2022 |

OTHER PUBLICATIONS

TW Notice of Allowance issued on Nov. 8, 2023.
Andriy Malovanyy, Jingjing Yang, Jozef Trela, Elzbieta Plaza, "Combination of upflow anaerobic sludge blanket UASB reactor and partial nitritation/anammox moving bed biofilm reactor MBBR for municipal wastewater treatment", Bioresource Technology, vol. 180, Mar. 2015, pp. 144-153, Elsevier.
J P Bassin 1, R Kleerebezem, A S Rosado, M C M van Loosdrecht, M Dezotti, "Effect of different operational conditions on biofilm development, nitrification, and nitrifying microbial population in moving-bed biofilm reactors", Environ Sci Technol, . Feb. 7, 2012;463:1546-55, pubs.acs.org/est.
A. di Biase; T. R. Devlin; and J. A. Oleszkiewicz, Ph.D., P.Eng., C.Eng., M.ASCE, "Start-Up of an Anaerobic Moving Bed-Biofilm Reactor and Transition to Brewery Wastewater Treatment", Journal of Environmental Engineering 14212, 06016008, 2016, Technical Note.
Frank Persson, Razia Sultana, Carolina Suarez, Malte Hermansson, Elzbieta Plaza, Britt-Marie Wilén, "Structure and composition of biofilm communities in a moving bed biofilm reactor for nitritation-anammox at low temperatures", Bioresource Technology, vol. 154, Feb. 2014, pp. 267-273, Elsevier.

* cited by examiner

MOVING BED BIOFILM REACTOR

CROSS REFERENCE TO RELATED APPLICATION

This application claims the benefits of Taiwan application Serial No. 111147736, filed on Dec. 13, 2022, the disclosures of which are incorporated by references herein in its entirety.

TECHNICAL FIELD

The present disclosure relates in general to a fluid treatment technology, and more particularly to a moving bed biofilm reactor that can resolve substantially problems in floating of bio carriers and short-circuiting of reactor tanks so as to enhance efficiency of anaerobic biological treatment process.

BACKGROUND

Global science and technology are changing with each passing day. While various industries are booming, people's attention has been also drawn to the effect upon the environment, especially upon the water resources. In the water treatment technology, biological treatments plays a very important role. Generally, the biological treatments are commonly featured in no chemical additives, environmental friendliness, and wide application fields, etc. In particular, a moving bed biofilm reactor (MBBR) is one of major parts for the biological treatments in the future.

In a typical moving bed biofilm reactor, a bio carrier with a biofilm is usually applied. The biofilm of the bio carrier is usually provided thereon with versatile micro organism flora for facilitating different biological treatments in various aerobic, anoxic and anaerobic environments with respect to different target fluids such as water, especially the wastewater.

Nevertheless, a major deficiency of the conventional moving bed biofilm reaction is short circuiting within the reaction device caused by uplift floating of the bio carrier, from which the performance of the anaerobic biological treatment would be affected. In order to solve this deficiency, corresponding increase in aeration demand and additional carbon sources is necessary. For example, fan blades are usually used to stir the fluid so as to improve or uniform the distribution of the bio carriers in the reaction tank. However, such a move would increase the energy and the cost, and inevitably cause a shortage in area for forming the fluid field. The aforesaid short circuiting is referred to a phenomenon of flowing the fluid in an unexpected short-cut route. As the short circuiting occurs, a problem of uneven mixing of reactants is prone to occur.

Accordingly, an issue how to develop a "moving bed biofilm reactor" that can improve the problems in floating of the bio carriers and short circuiting in the reaction tank so as to enhance the performance of anaerobic biological treatments, is definitely an urgent problem to be solved by skill in the art.

SUMMARY

In one embodiment of this disclosure, a moving bed biofilm reactor, applied to process a fluid, includes:
a tank body, including a cylindrical tank shell, a tank bottom disposed at a bottom end of the tank shell, and a tank top disposed at a top end of the tank shell, having thereinside a space for accommodating bio carriers, the tank shell be furnished with a water outlet and a gas outlet;
a first tube, having a plurality of first holes radially penetrating through the first tube, a first axis of the first tube being parallel to a water level and penetrating through the tank body, the plurality of first holes disposed inside the tank body being to guide the fluid from an exterior of the tank body into the tank body, a center of each of the plurality of first holes being equal to or lower than a horizontal level at the first axis of the first tube, an axial end of the first tube inside the tank body being a sealed end;
at least one second tube, having a plurality of second holes radially penetrating through the second tube, a second axis of the at least one second tube being parallel to the water level and penetrating through the tank body, the plurality of second holes disposed inside the tank body, the at least one second tube being disposed above the first tube by a distance, a center of each of the plurality of second holes being equal to or lower than a horizontal level of the second axis of the at least one second tube, an axial end of the at least one second tube inside the tank body being a sealed end;
a first guiding structure, disposed inside the tank body, including:
a first separator, shaped as a plate, having a bottom surface facing the at least one second tube by a distance, furnished with at least one first guide hole and a plurality of first separation holes by penetrating vertically through the first separator;
a first vertical plate, disposed on a top surface of the first separator, having oppositely a first surface and a second surface facing respective inner lateral walls of the tank shell, the first guide hole and the plurality of first separation holes being disposed at the first vertical plate in a side thereof having the first surface, a distance between the at least one first guide hole and the first vertical plate being greater than another distance between any of the plurality of first separation holes and the first vertical plate;
at least one first guide tube, having a plurality of third holes radially penetrating through the first guide tube, an axis of the at least one first guide tube being disposed on the bottom surface of the first separator by being perpendicular to the water level, a top end of the at least one first guide tube being connected with the at least one first guide hole, having an axial sealed end; and
a first baffle, shaped as a plate, having a top surface facing the at least one first guide tube and being located below the at least one first guide tube by a distance, and a bottom surface being located above the at least one second tube by a distance;
a second guiding structure, disposed inside the tank body above the first guiding structure, including:
a second separator, shaped as a plate, having a bottom surface facing down a top surface of the first separator by a distance, the bottom surface being separated to the top surface of the first vertical plate by a distance, furnished with at least one second guide hole and a plurality of second separation holes by penetrating vertically through the second separator;
a second vertical plate, disposed on a top surface of the second separator, having oppositely a third surface and a fourth surface facing respective inner lateral walls of the tank shell, the third surface facing the water outlet, the second vertical plate having a through hole extending from the third surface to the fourth surface, the at least one second guide hole being located in a side of the second vertical plate having the third surface, the plurality of second separation holes being located in another side thereof having the fourth surface, a vertical projection of the at least one second guide hole being overlapped onto that of the at least one first guide hole, a top end of the second vertical plate being connected with the tank top, a water-out space being defined by the second separator, the third surface, the tank top and the tank shell, the water-out space being connected spatially with the water outlet, a gas-out space being defined by the second separator, the fourth surface, the tank top and the tank shell;

at least one second guide tube, having a plurality of third holes radially penetrating through the second guide tube, an axis of the at least one second guide tube being disposed on the bottom surface of the second separator by being perpendicular to the water level, a top end of the at least one second guide tube being connected with the at least one second guide hole, the at least one second guide tube having an axial sealed end; and a second baffle, shaped as a plate, having a top surface facing the at least one second guide tube and being located below the at least one second guide tube by a distance, and a bottom surface being separated to a top surface of the first separator by a distance; and a return pipe, disposed exterior to the tank body to connect a space between the second surface of the first vertical plate and the adjacent tank shell, the first tube and the second tube, such that the fluid in the space can be flowed back into the first tube and the second tube.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
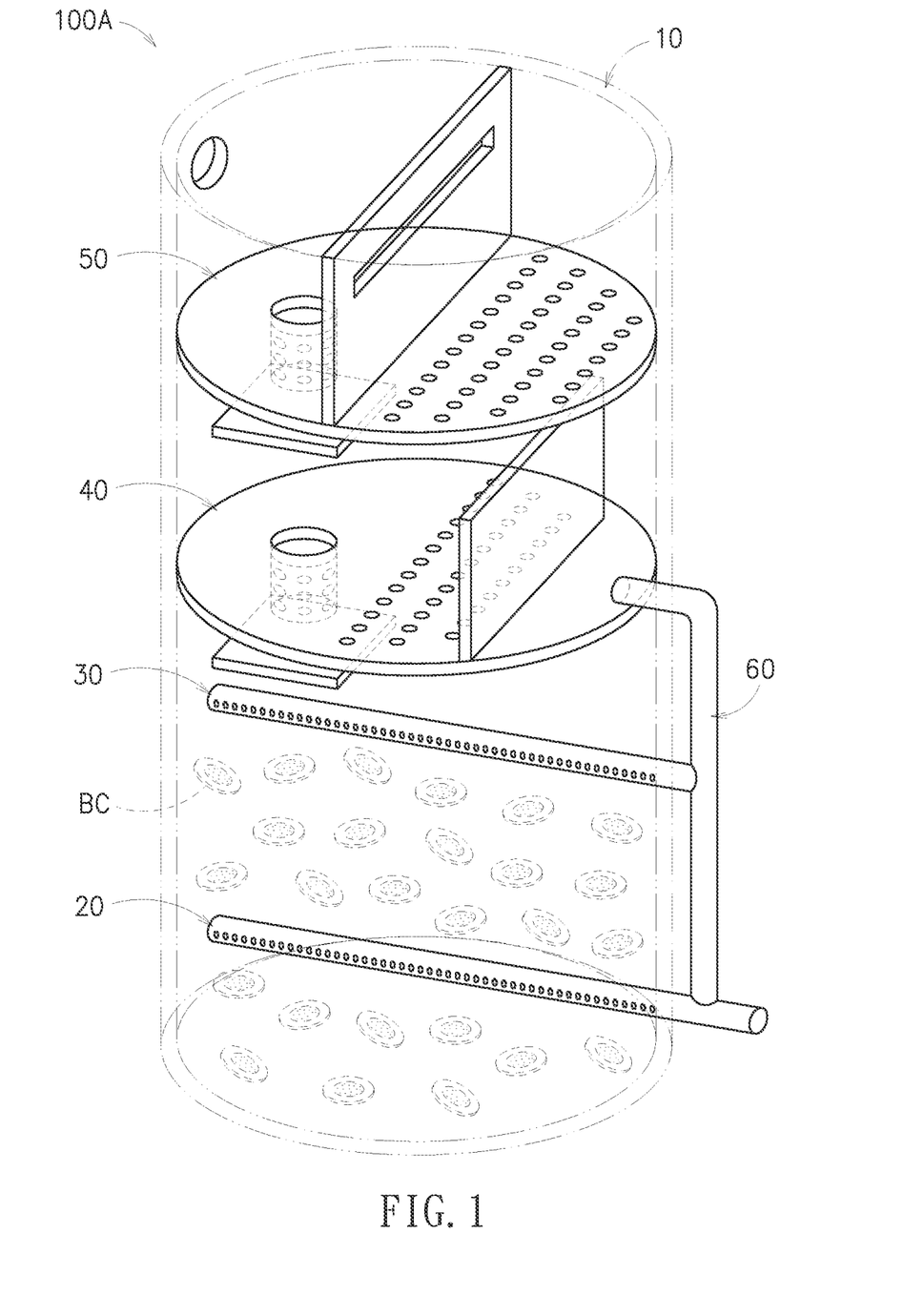
FIG. 1 is a schematic view of an embodiment of the moving bed biofilm reactor in accordance with this disclosure.

Referring to FIG. 1, in this embodiment, a moving bed biofilm reactor 100A includes a tank body 10, a first tube 20, a second tube 30, a first guiding structure 40, a second guiding structure 50 and a return pipe 60. The tank body 10 is provided to contain bio carriers BC thereinside.

Figure 2:
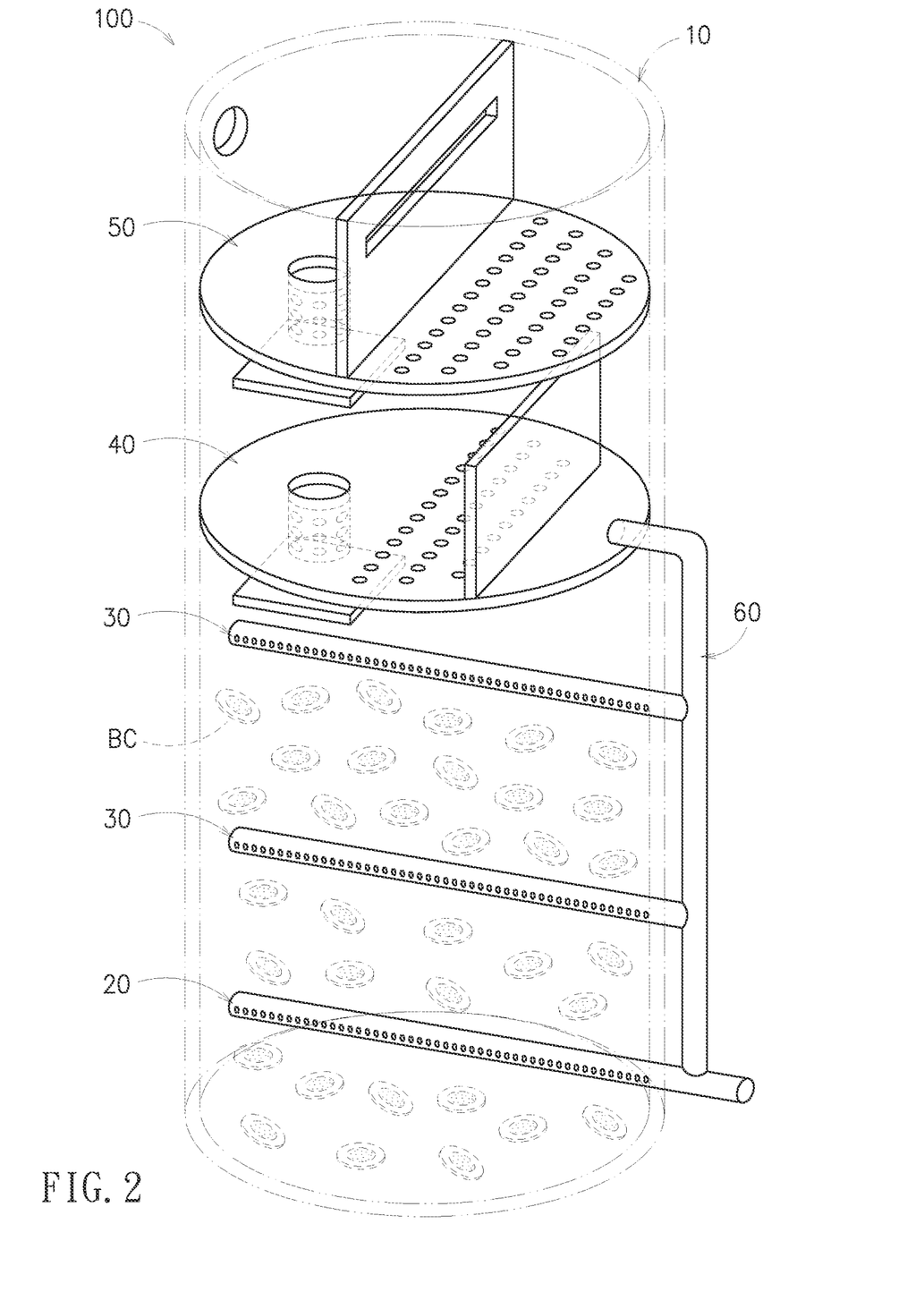
FIG. 2 is a schematic view of another embodiment of the moving bed biofilm reactor in accordance with this disclosure.

Referring to FIG. 2, in this embodiment, another moving bed biofilm reactor 100 includes a tank body 10, a first tube 20, two second tubes 30, a first guiding structure 40, a second guiding structure 50 and a return pipe 60. The tank body 10 is provided to contain the bio carriers BC thereinside.

With FIG. 1 and FIG. 2, it is to explain that, in the moving bed biofilm reactor 100A or 100, the quantity of the second tubes 30 is not limited, but up to practical requirements, not limited to a second tube 30 of FIG. 1 or two second tubes 30 of FIG. 2. In the following description, the embodiment shown in FIG. 2 would be taken as an example to elucidate structuring and functions of elements in this disclosure.

Figure 3:
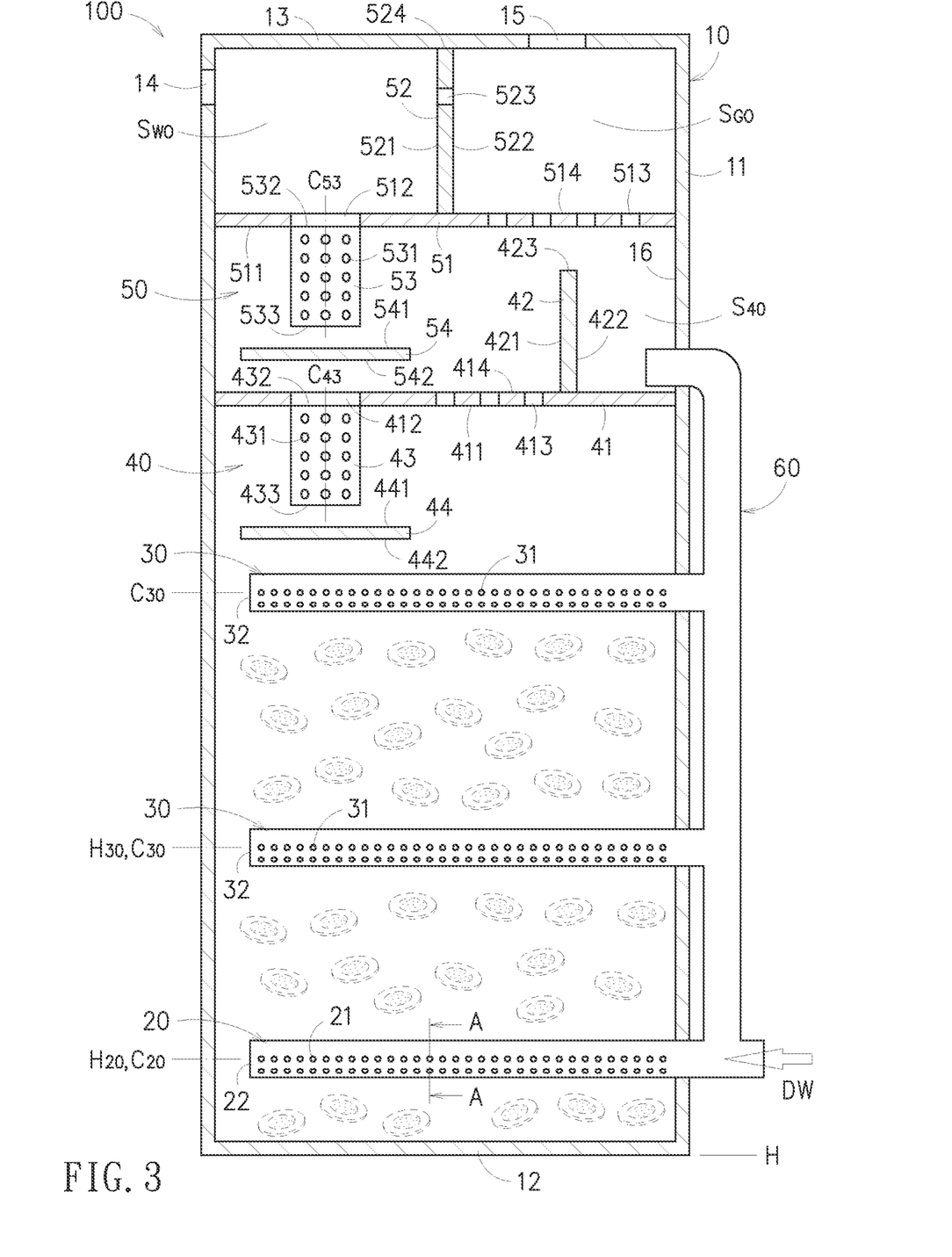
FIG. 3 is a schematic axial cross-sectional view of FIG. 2.
Figure 4:
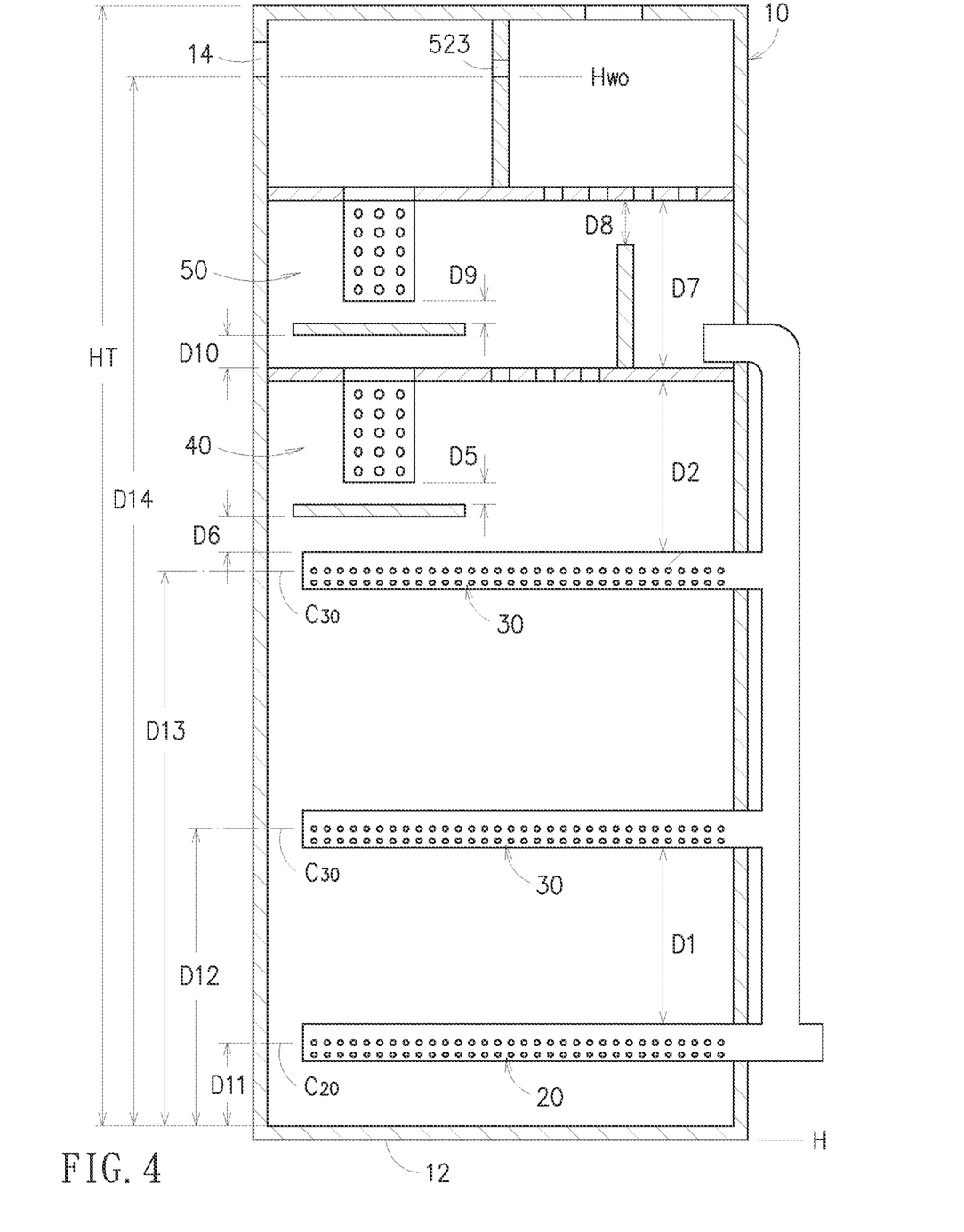
FIG. 4 shows schematically dimensional specifications of FIG. 2.

Referring to FIG. 2 to FIG. 4, the moving bed biofilm reactor 100 provided in this disclosure is applied to process fluids. In this embodiment, this reactor 100 is particularly used to purify waste water, and includes a tank body 10, a first tube 20, two second tubes 30, a first guiding structure 40, a second guiding structure 50 and a return pipe 60.

The tank body 10 includes a cylindrical tank shell 11, a tank bottom 12 disposed at a bottom end of the tank shell 11, and a tank top 13 disposed at a top end of the tank shell 11. A water outlet 14 is provided to the tank shell 11, and a gas outlet 15 is provided to the tank shell 11 or to the tank top 13 (as shown in FIG. 3).

The number and aspect of the water outlet 14 or the gas outlet 15 are not limited to the embodiments as illustrated in this disclosure, but up to practical requirements. As shown in FIG. 4, a distance D14 between a lower edge of the water outlet 14 and the tank bottom 12 is 85% to 95% of a total height HT of the tank body 10.

The tank body 10 has an internal space for accommodating bio carriers BC. After the tank body 10 is injected with a fluid, the bio carriers BC would be in a free floating state. In this embodiment, the fluid is waste water to undergo a purification treatment, and the bio carrier BC can be any carrier such as a PU foam or a non-woven fabric. The bio carrier BC can be used to carry a micro organism such as an ammonia-oxidizing bacteria or a nitrite-oxidizing bacteria, for effectively increasing a concentration of the micro organism.

Referring to FIG. 2 to FIG. 4, the first tube 20 has a plurality of first holes 21 radially penetrating through the first tube 20. A diameter of the first hole 21 is less than an outer diameter of the bio carrier BC.

An axis $C_{20}$ of the first tube 20 is parallel to a water level H penetrating horizontally through the tank body 10. The first holes 21 are disposed inside the tank body 10. An axial end of the first tube 20 inside the tank body 10 is a sealed end 22. The first tube 20 is used to lead the waste water DW into the tank body 10, and the tank body 10 can be filled up to the water outlet 14 with the waste water DW.

As shown in FIG. 4, a distance D11 between the axis $C_{20}$ of the first tube 20 and the tank bottom 12 is 2% to 10% of the total height HT of the tank body 10.

A center of each of the first holes 21 is equal to or lower than a horizontal level $H_{20}$ at the axis $C_{20}$ of the first tube 20.

Referring to FIG. 2 to FIG. 4, in this embodiment, two second tubes 30 are included and identically structured. In the following description, the upper second tube 30 is taken as an example for elucidating the structuring.

The second tube 30 has a plurality of second holes 31 radially penetrating through the second tube 30. A diameter of the second hole 31 is less than an outer diameter of the bio carrier BC.

An axis $C_{30}$ of the second tube 30 is parallel to a water level H penetrating horizontally through the tank body 10. The second holes 31 are disposed inside the tank body 10. An axial end of the second tube 30 inside the tank body 10 is a sealed end 32. The second tube 30 and the first tube 20 is spaced by a distance D1, and the second tube 30 is disposed above the first tube 20.

A center of each of the second holes 31 is equal to or less than a horizontal level $H_{30}$ of the axis $C_{30}$ of the second tube 30.

In this embodiment, ends of the first tube 20 and the second tube 30 inside the tank body 10 are the sealed ends 22, 32, respectively. Thus, the fluid (i.e., the waste water DW) inside the first tube 20 or the second tube 30 can be only flowed out of the first tube 20 or the second tube 30 via the first hole 21 or the second hole 31, respectively.

In this embodiment, the axis $C_{30}$ of each of the second tubes 30 is parallel to the axis $C_{20}$ of the first tube 20, a projection of each of the two second tubes 30 is overlapped with that of the first tube 20.

Referring to FIG. 4, this embodiment is furnished with two second tubes 30 parallel to each other at different levels. The level design of the second tubes 30 is that the axis $C_{30}$ of the second tube 30 close to the first tube 20 (the lower one in FIG. 4) is spaced to the tank bottom 12 by a distance D12, the distance D12 is 20% to 40% of the total height HT of the tank body 10, the axis $C_{30}$ of the second tube 30 far away from the first tube 20 (the upper one in FIG. 4) is spaced to the tank bottom 12 by a distance D13, and the distance D13 is 60% to 80% of the total height HT of the tank body 10.

Regarding dispositions and functions of the first holes 21 of the first tube 20 and the second holes 31 of the second tube 30, as shown in FIGS. 5, 5A, 6 and 6A, the first tube 20 from the same first and second tubes 20, 30 is taken as an example for elucidating the related structuring.

Figure 5:
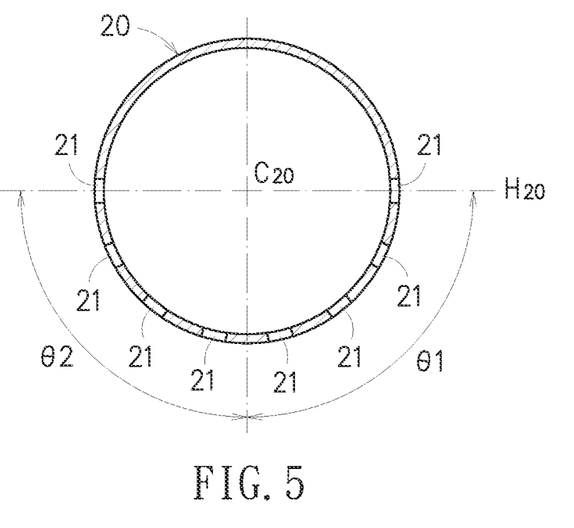
FIG. 5 illustrates schematically an exemplary example of the distribution of the first holes of the first guide tube in accordance with this disclosure.

Referring to FIG. 5, a cross-sectional view of the first tube 20 along line A-A of FIG. 3 is schematically illustrated. Centers of the respective first holes 21 are distributed at the first tube 20 in two vertical sector sections thereof with a first radial angle θ1 and a second radial angle θ2, respectively, with respect to the axis Co. In FIG. 5, the first radial angle θ1 and the second radial angle θ2 of this example are both 90°, and the first holes 21 are distributed at a lower portion of the first tube 20 with respect to the axis Co.

Figure 5A:
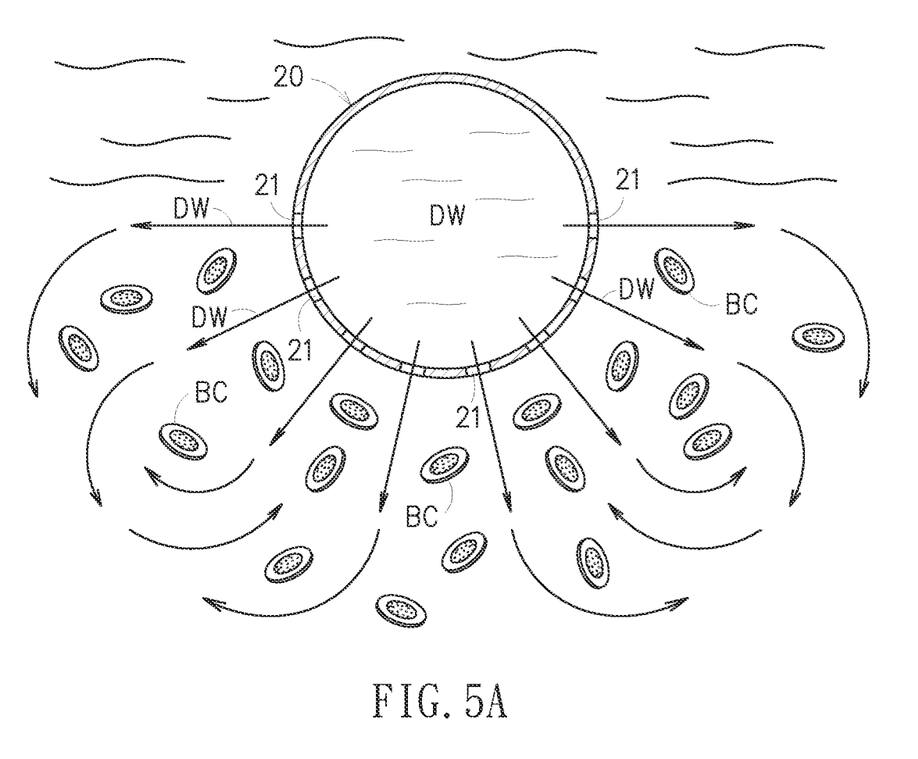
FIG. 5A demonstrates schematically the water curtain disturbance around the first guide tube of FIG. 5.

Referring to FIG. 5A, when the waste water DW inside the first tube 20 flows out of the first tube 20 via the first holes 21, a horizontal water curtain disturbance would be formed to prevent the bio carriers BC from up floating, such that the bio carriers BC and the waste water DW can be fully and evenly mixed.

Figure 6:
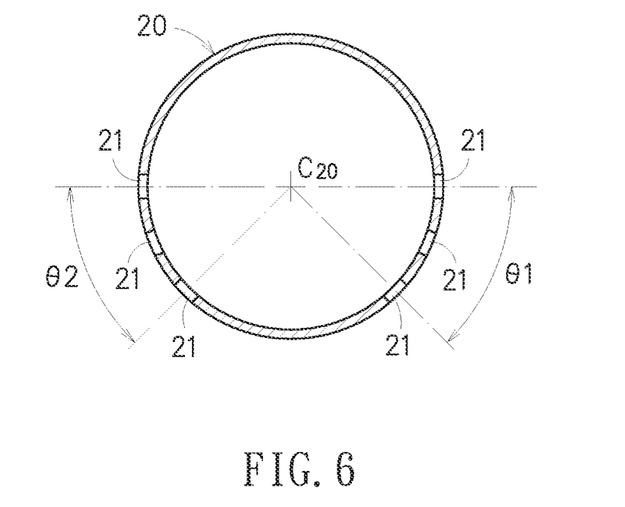
FIG. 6 illustrates schematically another exemplary example of the distribution of the first holes of the first guide tube in accordance with this disclosure.

Referring to FIG. 6, a difference between this embodiment and that of FIG. 5 is that, in this embodiment, the first radial angle θ1 and the second radial angle θ2 are both 45°.

Figure 6A:
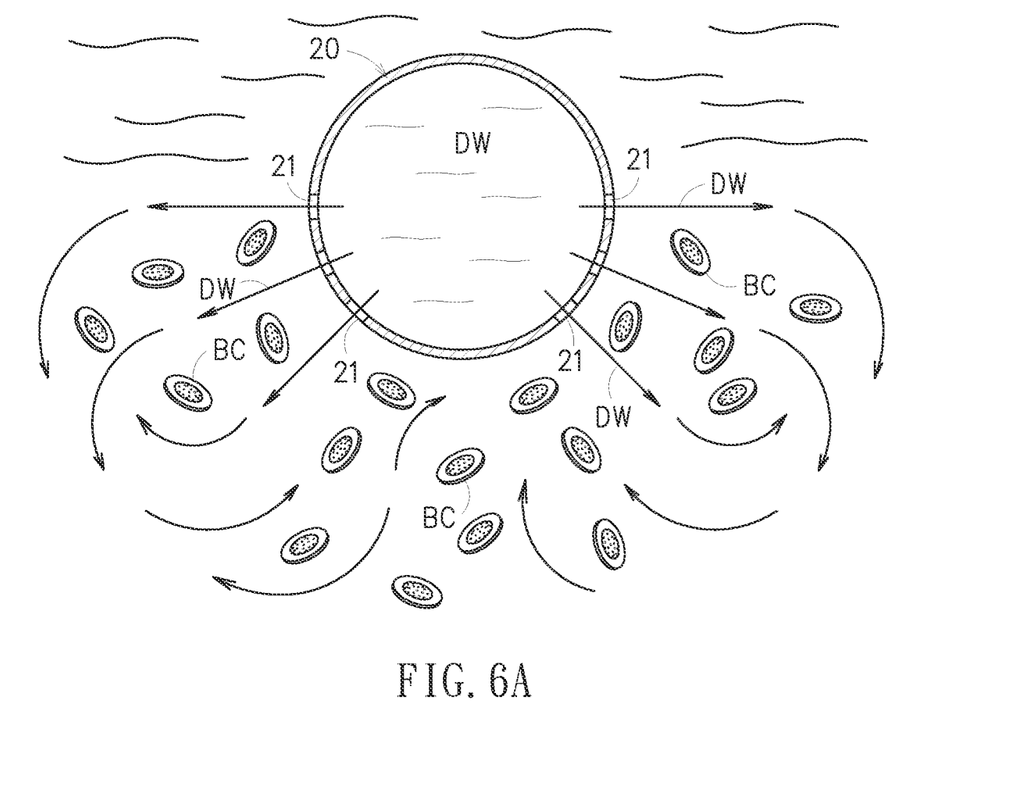
FIG. 6A demonstrates schematically the water curtain disturbance around the first guide tube of FIG. 6.

Referring to FIG. 6A, similarly, when the waste water DW inside the first tube 20 flows out of the first tube 20 via the first holes 21, a horizontal water curtain disturbance would be induced to prevent the bio carriers BC from up floating, such that the bio carriers BC and the waste water DW can be fully and evenly mixed.

From the embodiments of FIG. 5 and FIG. 6, a further embodiment by pairing different first radial angles θ1 and second radial angles θ2 can be generated. For example, in one embodiment, the first radial angle θ1 can be 90°, and the second radial angle θ2 can be 45°, and vice versa. Thus, each of the first radial angle θ1 and the second radial angle θ2 can be any angle between 0° and 90°, and the first radial angle θ1 and the second radial angle θ2 can be identical or different.

In addition, the first hole 21 of FIG. 3 are arranged separately along the axis Co of the first tube 20, but not limited thereto. However, each of the centers of the first holes 21 is equal to or lower than the horizontal level $H_{20}$ of the axis $C_{20}$ of the first tube 20. Similarly, each of centers of the second holes 31 is equal to or lower than the horizontal level $H_{30}$ of the axis $C_{30}$ of the second tube 30.

Referring to FIG. 2 to FIG. 4, and FIG. 7A, the first guiding structure 40, disposed inside the tank body 10, includes a first separator 41, a first vertical plate 42, a first guide tube 43 and a first baffle 44.

The first separator 41, shaped as a plate, has a bottom surface 411 facing the second tube 30 located away from the first tube 20 (i.e., the upper one in FIG. 4) by a distance D2. The first separator 41 is furnished with at least one first guide hole 412 and a plurality of first separation holes 413 by penetrating vertically through the first separator 41.

A diameter of the first separation hole 413 is less than an outer diameter of the bio carrier BC. In this disclosure, the distribution of the first separation holes 413 can be various, but not limited to the array type as illustrated.

The first vertical plate 42 is disposed to a top surface 414 of the first separator 41. The first vertical plate 42 has oppositely a first surface 421 and a second surface 422 facing respective inner lateral walls 16 of the tank shell 11.

Figure 7A:
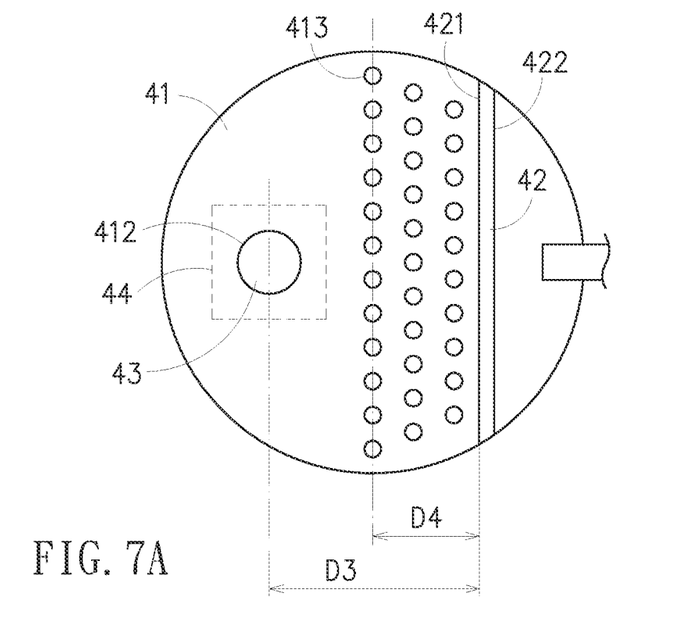
FIG. 7A is a schematic top view of an embodiment of the first guiding structure in accordance with this disclosure.

Referring to FIG. 7A, the first guide hole 412 and the first separation hole 413 are both disposed at the first vertical plate 42 in a side having the first surface 421. A distance D3 between the first guide hole 412 and the first vertical plate 42 is greater than another distance D4 between the first separation hole 413 and the first vertical plate 42. Namely, the first separation hole 413 is disposed between the first guide hole 412 and the first vertical plate 42.

Referring to FIG. 2 to FIG. 4, the first guide tube 43 has a plurality of third holes 431 radially penetrating through the first guide tube 43, and a diameter of the third hole 431 is less than an outer diameter of the bio carrier BC.

An axis $C_{43}$ of the first guide tube 43, perpendicular to the water level H, is disposed on the bottom surface 411 of the first separator 41. A top end 432 of the first guide tube 43 is connected with the first guide hole 412, and a bottom surface 433 of the first guide tube 43 is a sealed end.

The first baffle 44 has a top surface 441 facing the first guide tube 43 and being located below the first guide tube 43 by a distance D5, and a bottom surface 442 away from the first tube 20 (the upper one in FIG. 4) and being located above the second tube 30 by a distance D6.

Referring to FIG. 2 to FIG. 4, and FIG. 7B, the second guiding structure 50, disposed inside the tank body 10 and above the first guiding structure 40, includes a second separator 51, a second vertical plate 52, a second guide tube 53 and a second baffle 54.

The second separator 51, shaped as a plate, has a bottom surface 511 facing the top surface 414 of the first separator 41 by a distance D7. The bottom surface 511 of the second separator 51 is spaced from a top end 423 of the first vertical plate 42 by a distance D8. The second separator 51 is furnished with at least one second guide hole 512 and a plurality of second separation holes 513 by penetrating vertically through the second separator 51.

A diameter of the second separation hole 513 is less than an outer diameter of the bio carrier BC. In this disclosure, the distribution of the second separation holes 513 can be various, but not limited to the array type as illustrated.

The second vertical plate 52 is disposed to a top surface 514 of the second separator 51. The second vertical plate 52 has oppositely a third surface 521 and a fourth surface 522 facing respective inner lateral walls 16 of the tank shell 11. In particular, the third surface 521 faces the water outlet 14.

The second vertical plate 52 has a through hole 523 extending from the third surface 521 to the fourth surface 522; i.e., by penetrating through the second vertical plate 52. A lower edge of the through hole 523 and another lower edge of the water outlet 14 are located at the same horizontal level $H_{WO}$. A top end 524 of the second vertical plate 52 is connected with the tank top 13.

Figure 7B:
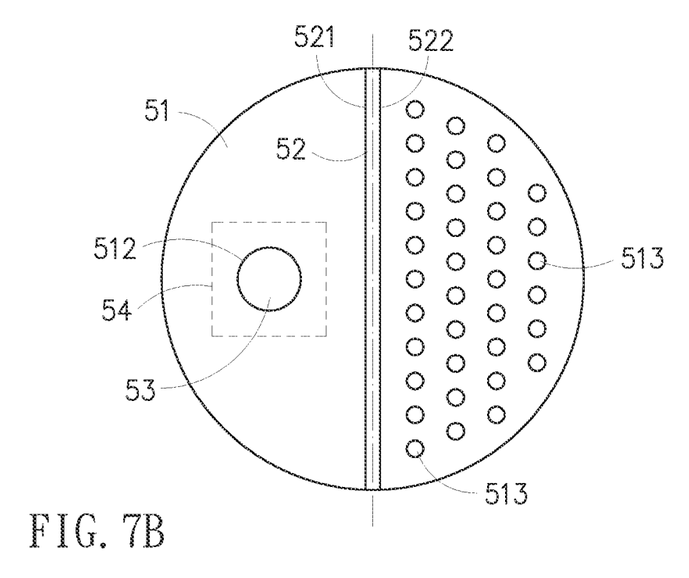
FIG. 7B is a schematic top view of an embodiment of the second guiding structure in accordance with this disclosure.

Referring to FIG. 7B, the second guide hole 512 is located in a side of the second vertical plate 52 having the third surface 521, and the second separation hole 513 is located in another side of the second vertical plate 52 having the fourth surface 522. A vertical projection of the second guide hole 512 is overlapped onto that of the first guide hole 412.

Referring to FIG. 3, a water-out space $S_{WO}$, defined or enclosed by the second separator 51, the third surface 521, the tank top 13 and the tank shell 11, is connected spatially with the water outlet 14. In addition, a gas-out space $S_{GO}$ is defined by the second separator 51, the fourth surface 522, the tank top 13 and the tank shell 11.

Referring to FIG. 2 to FIG. 4, the second guide tube 53 has a plurality of fourth holes 531 radially penetrating through the second guide tube 53, and a diameter of the fourth hole 531 is less than the outer diameter of the bio carrier BC.

An axis $C_{53}$ of the second guide tube 53, perpendicular to the water level H, is disposed on the bottom surface 511 of the second separator 51. A top end 532 of the second guide tube 53 is connected with the second guide hole 512, and a bottom end 533 of the second guide tube 53 is a sealed end.

The second baffle 54 has a top surface 541 facing the second guide tube 53, and being located below the second guide tube 53 by a distance D9, and a bottom surface 542 spaced from the top surface 414 of the first separator 41 by a distance D10. A vertical projection of the second baffle 51 is overlapped with that of the first baffle 41.

Referring to FIG. 7A and FIG. 7B, the first separation hole 413 is disposed between the first guide hole 412 and the first vertical plate 42, and the first separation hole 413 is disposed between the vertical projection of the second vertical plate 52 on the first separator 41 and the first vertical plate 42. In this embodiment, the second vertical plate 52 is disposed at a middle position of the second separator 51, and also the first separation holes 413 are located in a middle of the first separator 41.

Figure 8A:
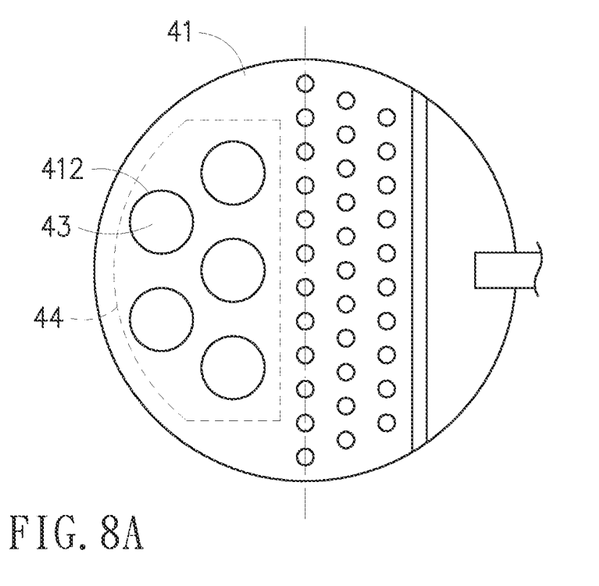
FIG. 8A is a schematic top view of another embodiment of the first guiding structure in accordance with this disclosure.
Figure 8B:
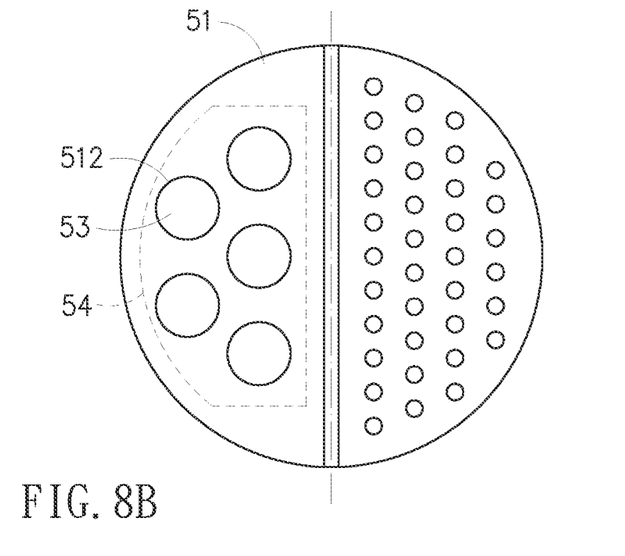
FIG. 8B is a schematic top view of another embodiment of the second guiding structure in accordance with this disclosure.

Referring to FIG. 8A and FIG. 8B, in another embodiment, the first separator 41 is furnished with five first guide holes 412, and each of the first guide holes 412 is provided with a first guide tube 43. In addition, the second separator 51 is furnished with five second guide holes 512, and each of the second guide holes 512 is provided with a second guide tube 53. In this disclosure, the shape of the first baffle 44 or the second baffle 54 is varied with the number and distribution of the first guide tubes 43 and the second guide tubes 53.

In FIG. 8A and FIG. 8B, the number of the first guide tube 43 or the second guide tube 53 is not limited, can be one as shown in FIG. 7A or FIG. 7B, or plural as shown in FIG. 8A or FIG. 8B according to practical requirements. In addition, the number of the first guide tube 43 and that of the second guide tube 53 can be identical or different.

Referring to FIG. 2 to FIG. 4, a return pipe 60 is disposed exterior to the tank body 10 to connect a space $S_{40}$ between the second surface 422 of the first vertical plate 42 and the adjacent tank shell 11, the first tube 20 and the second tube 30, such that the fluid in the space $S_{40}$ (such as the waste water) can be flowed back into the first tube 20 and the second tube 30.

The return pipe 60 is configured to provide functions of a flow devising valve. According to practical needs, diameters and flow capacity of the return pipe 60 can be determined. After the fluid inside the space $S_{40}$ (such as the waste water) can be sent into the first tube 20 and the second tube 30, the horizontal water curtain disturbance as shown in FIG. 5 to FIG. 6A can be formed to avoid possible up floating of the bio carriers BC and to promote a sufficient mixing.

Generally, a motor, pump or the like (not shown in the figure) can be provided to an upper portion of the return pipe 60 so as helpfully to suck the waste water from the space $S_{40}$ and then send it into the first tube 20 and the second tube 30.

Figure 9:
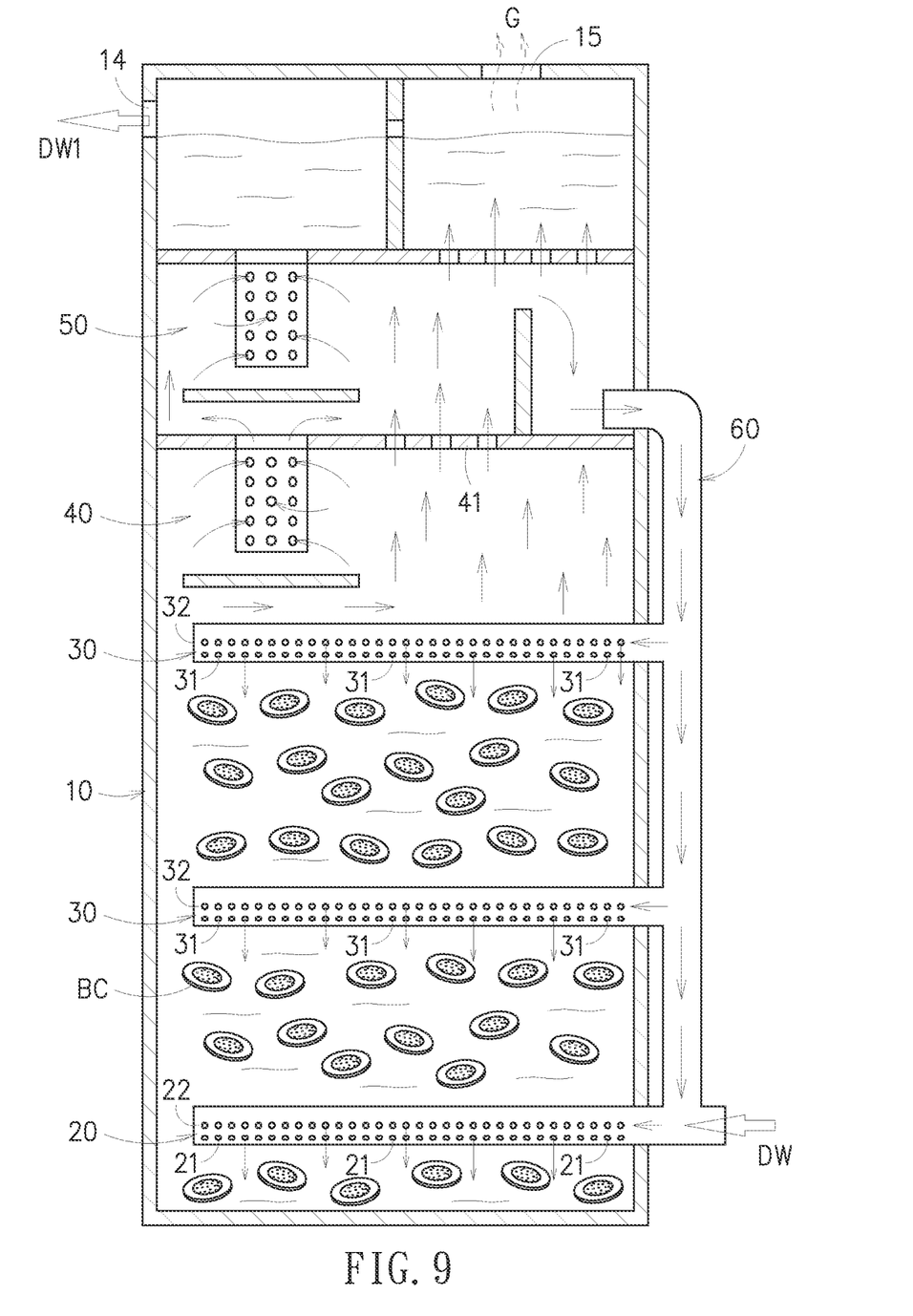
FIG. 9 demonstrates schematically a work state of the fluid treatment in accordance with this disclosure.

Referring to FIG. 9, operations of the moving bed biofilm reactor in this disclosure is elucidated. The moving bed biofilm reactor provided in this disclosure is suitable to process the fluid. In this embodiment, the fluid is a waste water ready to undergo a purification treatment.

The waste water DW is sent into the tank body 10 via the first tube 20, and simultaneously the waste water DW in the space $S_{40}$ would be sent into the first tube 20 and the second tube 30 via the return pipe 60. Since the axial ends of the first tube 20 and the second tube 30 inside the tank body 10 are both the sealed ends 22, 32, thus the waste water DW would be discharged through the first holes 21 and the second holes 31, such that corresponding water curtain disturbances upon the bio carriers BC would be formed around the first tube 20 and the second tube 30; particularly, under the first tube 20 and the second tube 30. Thereupon, the bio carriers BC would be retained in the spaces under the first tube 20 and the second tube 30. Namely, the up floating of the bio carriers BC in these space would be significantly reduced, and thus the bio carriers BC and the waste water DW in these spaces can be fully mixed and reacted.

Then, the waste water DW would consequently pass the first guiding structure 40 and the second guiding structure 50 for undergoing the solid/liquid/gas three phase separations. In this embodiment, though a slight amount of the bio carriers BC might be up floated to the zone having the first guiding structure 40, yet the first separator 41 is there to avoid further up floating.

Finally, the treated waste water DW1 would be discharged via the water outlet 14 at a side of the tank body 10, while a gas G generated during the process would be exhausted through the gas outlet 15 at top of the tank body 10. It is noted that, in this embodiment, the waste water DW can be filled up to the water outlet 14 of the tank body 10.

To sum up, the moving bed biofilm reactor provided in this disclosure is applicable to process fluids. In one embodiment, the fluid is a waste water awaiting a purification treatment. The moving bed biofilm reactor of this disclosure includes a tank body, a first tube, a second tube, a first guiding structure, a second guiding structure and a return pipe. The first tube and the second tube are integrated inside the tank body to form a reaction zone, while the first guiding structure and second guiding structure are integrated inside the tank body to form a solid/liquid/gas three-phase separation zone. With the first tube and the second tube to form multi-layer horizontal water curtain disturbances for well and even mixing in the reaction zone, the process to remove the gas in the bio carrier can be accelerated, the possibility for the micro organism to attach the bio carrier would be increased, the gas emission of the associated guide reaction would be promoted, and thus the fluid treatment in the anaerobic biological process can be substantially improved.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A moving bed biofilm reactor, applied to process a fluid, comprising:
    a tank body, including a cylindrical tank shell with a water outlet and a gas outlet, a tank bottom disposed at a bottom end of the tank shell, and a tank top disposed at a top end of the tank shell, having thereinside a space;
    a first tube, having a plurality of first holes radially penetrating through the first tube, a first axis of the first tube being parallel to a water level and penetrating through the tank body, the plurality of first holes disposed inside the tank body being to guide the fluid from an exterior of the tank body into the tank body, a center of each of the plurality of first holes being equal to or lower than a horizontal level at the first axis of the first tube, an axial end of the first tube inside the tank body being a sealed end;
    at least one second tube, having a plurality of second holes radially penetrating through the second tube, a second axis of the at least one second tube being parallel to the water level and penetrating through the tank body, the plurality of second holes disposed inside the tank body, the at least one second tube being disposed above the first tube by a distance, a center of each of the plurality of second holes being equal to or lower than a horizontal level of the second axis of the at least one second tube, an axial end of the at least one second tube inside the tank body being a sealed end;
    a first guiding structure, disposed inside the tank body, including:
        a first separator, shaped as a plate, having a bottom surface facing the at least one second tube, furnished with at least one first guide hole and a plurality of first separation holes;
        a first vertical plate, disposed on a top surface of the first separator, having oppositely a first surface and a second surface facing respective inner lateral walls of the tank shell, the first guide hole and the plurality of first separation holes being disposed at the first vertical plate in a side thereof having the first surface, a distance between the at least one first guide hole and the first vertical plate being greater than another distance between any of the plurality of first separation holes and the first vertical plate;
        at least one first guide tube, having a plurality of third holes, a top end connected with the at least one first guide hole, and a bottom sealed end; and
        a first baffle, shaped as a plate, having a top surface facing the at least one first guide tube and being located below the at least one first guide tube by a distance, and a bottom surface being located above the at least one second tube by a distance;
    a second guiding structure, disposed inside the tank body above the first guiding structure, including:
        a second separator, shaped as a plate, having a bottom surface facing down a top surface of the first separator by a distance, the bottom surface being separated to the top surface of the first vertical plate by a distance, furnished with at least one second guide hole and a plurality of second separation holes by penetrating vertically through the second separator;
        a second vertical plate, disposed on a top surface of the second separator, having oppositely a third surface and a fourth surface facing respective inner lateral walls of the tank shell, the third surface facing the water outlet, the second vertical plate having a through hole extending from the third surface to the fourth surface, the at least one second guide hole being located in a side of the second vertical plate having the third surface, the plurality of second separation holes being located in another side thereof having the fourth surface, a vertical projection of the at least one second guide hole being overlapped onto that of the at least one first guide hole, a top end of the second vertical plate being connected with the tank top, a water-out space being defined by the second separator, the third surface, the tank top and the tank shell, the water-out space being connected spatially with the water outlet, a gas-out space being defined by the second separator, the fourth surface, the tank top and the tank shell;
        at least one second guide tube, having a plurality of third holes radially penetrating through the second guide tube, an axis of the at least one second guide tube being disposed on the bottom surface of the second separator by being perpendicular to the water level, a top end of the at least one second guide tube being connected with the at least one second guide hole, the at least one second guide tube having an axial sealed end; and
        a second baffle, shaped as a plate, having a top surface facing the at least one second guide tube and being located below the at least one second guide tube by a distance, and a bottom surface being separated to a top surface of the first separator by a distance; and
    a return pipe, disposed exterior to the tank body to connect a space between the second surface of the first vertical plate and the adjacent tank shell, the first tube and the second tube, such that the fluid in the space can be flowed back into the first tube and the second tube.

2. The moving bed biofilm reactor of claim 1, wherein the second axis of the at least one second tube is parallel to the first axis of the first tube, and a vertical projection of the at least one second tube is overlapped with that of the first tube.

3. The moving bed biofilm reactor of claim 1, wherein the centers of the plurality of first holes are distributed at the first tube in two vertical sector sections thereof with a first radial angle and a second radial angle, respectively, with respect to the first axis of the first tube.

4. The moving bed biofilm reactor of claim 3, wherein each of the first radial angle and the second radial angle is ranged within 0 to 90°.

5. The moving bed biofilm reactor of claim 1, wherein a diameter of any of each of the plurality of first holes, each of the plurality of second holes, each of the plurality of third holes, each of the plurality of fourth holes, each of the plurality of first separation holes and each of the plurality of second separation hole is less than an outer diameter of the bio carrier.

6. The moving bed biofilm reactor of claim 1, wherein the plurality of first separation holes are is disposed between the vertical projection of the second vertical plate on the first separator and the first vertical plate.

7. The moving bed biofilm reactor of claim 1, wherein a lower edge of the through hole of the second vertical plate and a lower edge of the water outlet are leveled at the water level.

8. The moving bed biofilm reactor of claim 1, wherein the first separator is furnished with a plurality of the first guide holes, and each of the plurality of the first guide holes is provided with the first guide tube.

9. The moving bed biofilm reactor of claim 1, wherein the second separator is furnished with a plurality of the second guide holes, and each of the plurality of the second guide holes is provided with the second guide tube.

10. The moving bed biofilm reactor of claim 1, further including a plurality of the second tubes, wherein an axis of the plurality of the second tubes is parallel to the first axis of the first tube, and a vertical projection of the plurality of the second tubes is overlapped with that of the first tube.

11. The moving bed biofilm reactor of claim 10, wherein a distance between the first axis of the first tube and the tank bottom is 2% to 10% of a total height of the tank body.

12. The moving bed biofilm reactor of claim 10, wherein a distance between the second axis of the at least one second tube and the tank bottom is 20% to 40% of a total height of the tank body.

13. The moving bed biofilm reactor of claim 10, wherein the plurality of second tubes includes a lower second tube and an upper second tube, a distance between the upper second tube and the tank bottom is 60% to 80% of a total height of the tank body.

14. The moving bed biofilm reactor of claim 10, wherein a distance between a lower edge of the water outlet and the tank bottom is 85% to 95% of a total height of the tank body.

* * * * *